US006916242B1

(12) United States Patent
Takeyama et al.

(10) Patent No.: US 6,916,242 B1
(45) Date of Patent: Jul. 12, 2005

(54) GAME SYSTEM, GAME CONTROL METHOD, AND COMPUTER-READABLE STORAGE MEDIUM

(75) Inventors: So Takeyama, Tokyo (JP); Takaaki Inoue, Tokyo (JP)

(73) Assignee: Konami Corporation, Tokyo (JP)

( * ) Notice: Subject to any disclaimer, the term of this patent is extended or adjusted under 35 U.S.C. 154(b) by 210 days.

(21) Appl. No.: 10/018,408

(22) PCT Filed: Jun. 14, 2000

(86) PCT No.: PCT/JP00/03854

§ 371 (c)(1), (2), (4) Date: Dec. 13, 2001

(87) PCT Pub. No.: WO00/76608

PCT Pub. Date: Dec. 21, 2000

(30) Foreign Application Priority Data

Jun. 14, 1999 (JP) .......................................... 11-167332

(51) Int. Cl.7 ................................................ A63F 13/00
(52) U.S. Cl. ..................................... 463/20; 273/143 R
(58) Field of Search .............................. 463/12–13, 16, 463/20–22, 25, 30–31, 37; 273/143 R, 292

(56) References Cited

U.S. PATENT DOCUMENTS 5,890,962 A * 4/1999 Takemoto .................... 463/20
6,098,985 A * 8/2000 Moody ....................... 273/292
6,261,178 B1 * 7/2001 Bennett ....................... 463/20

FOREIGN PATENT DOCUMENTS

| | | | | |
|---|---|---|---|---|
| JP | 7-213684 | | 8/1995 | |
| JP | 09220369 | | 8/1997 | |
| JP | 09-220369 | * | 8/1997 | ............. A63F/9/22 |

* cited by examiner

*Primary Examiner*—Kim Nguyen
(74) *Attorney, Agent, or Firm*—Jordan and Hamburg LLP

(57) ABSTRACT

In a game system having a monitor, an input unit for supplying a signal corresponding to a player's operation, and a game controller for executing a predetermined card game on a game screen of the monitor with reference to the signal supplied from the input unit, the game controller decides a plurality of cards displayed on the game screen in a matrix. The game controller sets the number of lines of a plurality of lines formed by the cards on the game screen, each as an effective line and all of which are in a single, common direction, depending on the value of a play a player sets by operating the input device, and controls a dividend for the player according to a combination of the cards on any of the effective line and a combination of the cards in a direction different from the direction of the effective lines.

18 Claims, 12 Drawing Sheets

GAME SYSTEM, GAME CONTROL METHOD, AND COMPUTER-READABLE STORAGE MEDIUM

TECHNICAL FIELD

The present invention relates to a game system for performing a card game such as poker and the like on a video screen.

BACKGROUND ART

There is known a kind of an arcade game machine for performing a poker game on a video screen. In this kind of the game machine, a predetermined number of cards (typically, five cards) are distributed to a player on a screen and if a combination set as a successful hand is included in the above cards, a player wins and a predetermined dividend is given to the player.

The above-mentioned game machine is advantageous for a player to understand the content of a game easily because of performing the game truly according to a rule of the poker game of the trump. On the contrary, the probability of completing a successful hand is restricted by the rule of the game and accordingly, a player feels monotonous because of the short of surprise and accidental performance.

DISCLOSURE OF THE INVENTION

An object of the present invention is to provide a game system, a game control method, and a storing medium suitable for them in much consideration of surprise and accidental performance without impairing easiness of a game.

In order to achieve the above object, a game system according to the present invention comprises: a display unit which can display a game screen; an input unit for supplying a signal corresponding to a player's operation; and a game controller for executing a predetermined card game on a screen of the display unit with reference to the signal supplied from the input unit, and the game controller includes: a card deciding device for deciding a plurality of cards displayed on the game screen in a matrix shape, a betting device for setting the number of lines depending on the value of a play, which a player sets by operating the input device, of a plurality of lines formed by the cards arranged in a predetermined direction on the game screen, as an effective line, and a dividend controlling device for controlling a dividend for a player respectively according to a combination of the cards on the effective line and a combination of the cards in a direction different from the direction of the above line.

Thus, the present invention employs a rule of producing a dividend when a successful hand of a well-known card game such as poker is completed on the effective lines, thereby keeping familiarity and easiness for the game, similarly to the conventional card game machine. When a combination of the cards in a direction different from the line satisfies a predetermined condition, an operation for changing (producing, increasing, or decreasing) a dividend is performed, thereby enhancing a player's fun of the game by adding surprise and accidental performance to the well-known card game.

In the game system according to the present invention, the betting device can increase the number of the effective lines according as the play value increases, and the dividend controlling device can produce the dividend or changes the dividend having been produced, when a predetermined number, two or more of the effective lines is selected and a predetermined combination is formed by the cards on the predetermined number of the effective lines in a direction different from the direction of the above line.

Therefore, the number of the effective lines is increased as a player increases the value of the play. When the number of the effective lines reaches the predetermined number, the dividend controlling device controls a dividend according to a combination of the cards in a direction different from that of the line. Accordingly, a player can select how to play a game; in pursuit of a combination of the cards only on the effective lines or in pursuit of a combination of the cards also in a direction different from the line as well as the above combination, according to the value of the play.

In the game system according to the present invention, the dividend controlling device can produce the dividend when the cards on at least one effective line of the predetermined number of the effective lines form a combination set as a successful hand, or when the cards on the predetermined number of the effective lines form a predetermined combination in a direction different from the direction of the above line.

Therefore, even if a successful hand is not formed on the effective line, a dividend may be produced by forming a predetermined combination in a direction different from the line. Accordingly, the present invention can enhance surprise and accidental performance for a dividend.

In the game system according to the present invention, the dividend controlling device can produce the dividend for the successful hand when a combination set as a successful hand is completed by the cards at least on one effective line of the predetermined number of the effective lines, and changes the dividend for the successful hand when a predetermined combination is completed by the cards on the predetermined number of the effective lines in a direction different from the direction of the above line.

In this case, if a dividend is produced by forming a successful hand on the effective lines, the dividend is changed by a combination of the cards in a direction different from the line. Therefore, the present invention can create a situation in which a dividend is further increased or the dividend once obtained is decreased, thereby enhancing the fun of the game.

In the game system according to the present invention, the line may be set in one direction of a vertical direction and a horizontal direction of the matrix, and the dividend controlling device can produce the dividend or change the dividend having been produced when a predetermined combination is formed by the cards on the predetermined number of the effective lines, at least in the diagonal direction or in a direction crossing with the above line at right angle in the matrix.

Therefore, the dividend is controlled depending on a combination of the cards placed in a vertical, a horizontal, or a diagonal direction of the matrix. Accordingly, it is possible to give the card game surprise and accidental performance which cannot be obtained in a game of controlling a dividend only depending on a combination of the cards placed in one direction.

In the game system according to the present invention, the predetermined number may correspond to the maximum number of the lines included in the matrix. In this case, unless the player sets the value of the play so as to make all lines be selected as the effective lines in one time of the game, a combination of the cards in a direction different from the line is not evaluated, and the nature of the greatest hit is given to that combination, thereby attracting the player's interest.

In the game system according to the present invention, trump cards may be used as the above-mentioned plurality of the cards, and the dividend controlling device may produce the dividend when a successful hand is formed on the effective lines in a card game using the trump cards.

In this case, the card game familiar to a lot of players, like poker, is performed on the effective lines, thereby keeping easiness for the game.

In the game system according to the present invention, the dividend controlling device may produce the dividend or change the dividend having been produced when a predetermined number of the cards of the same mark or the cards of the same number is placed in a direction different from the direction of the above line.

Therefore, some combination of the cards different from the combination of the well-known card game like a poker game can be determined as a successful hand associated with a dividend, thereby adding more surprise and accidental performance to the game.

The game system according to the present invention may further comprise a selecting device for selecting reception of a dividend or a chance of increasing a dividend when the dividend controlling device produces the dividend, according to a player's instruction given by the input unit; and a dividend increase controlling device for increasing the dividend if an outcome of the game satisfies a predetermined condition, while performing a predetermined game, when the above chance is selected.

According to the above structure, when some dividend is produced in a game using the cards arranged in a matrix shape, a chance of further increasing the dividend is given to a player, thereby enhancing the player's fun for the game.

The game system according to the present invention may further comprise a discriminating device for checking whether or not to advance the count associated with a chance of increasing the dividend based on the outcome of the game, every time a game using a plurality of the cards placed in the matrix shape is performed; and a probability controlling device for increasing a probability of achieving the outcome satisfying the predetermined condition in a game performed by the dividend increase controlling device, when the dividend controlling device produces the dividend as the above count reaches a predetermined value.

According to the above structure, the count is advanced according as a game using the cards arranged in a matrix shape is repeated, and after the count reaches the predetermined value, it becomes easier to take a chance of increasing the dividend, thereby keeping the player's fun for the game for a longer time.

In the game system according to the present invention, the dividend increase controlling device may make a player select a predetermined number of the cards from the plurality of the cards, in the game, and may execute a game for deciding victory or defeat according as whether the selected cards satisfy a predetermined condition or not, and the probability controlling device may increase the probability by increasing the number of the cards selectable by the player.

Thus, a player can recognize a change of the probability clearly, according to an increase in the number of the selectable cards.

A game controlling method according to the present invention is to execute the following procedures by a computer provided in a game system: a procedure of deciding a plurality of cards displayed on a game screen in a matrix shape, a procedure of setting the number of lines depending on the value of a play a player sets, of a plurality of lines formed by the cards arranged in a predetermined direction on the game screen, as an effective line, and a procedure of controlling a dividend for a player respectively according to a combination of the cards on the effective line and a combination of the cards in a direction different from the direction of the above line.

A storing medium readable by a computer according to the present invention is to store a program for working the computer provided in a game system as a card deciding device for deciding a plurality of cards displayed on a game screen in a matrix shape, a betting device for setting the number of lines depending on the value of a play a player sets, of a plurality of lines formed by the cards arranged in a predetermined direction on the game screen, as an effective line, and a dividend controlling device for controlling a dividend for a player respectively according to a combination of the cards on the effective line and a combination of the cards in a direction different from the direction of the above line.

According to the method or the storing medium, the game system of the present invention can be formed at ease.

BEST MODE FOR CARRYING OUT THE INVENTION

Figure 1:
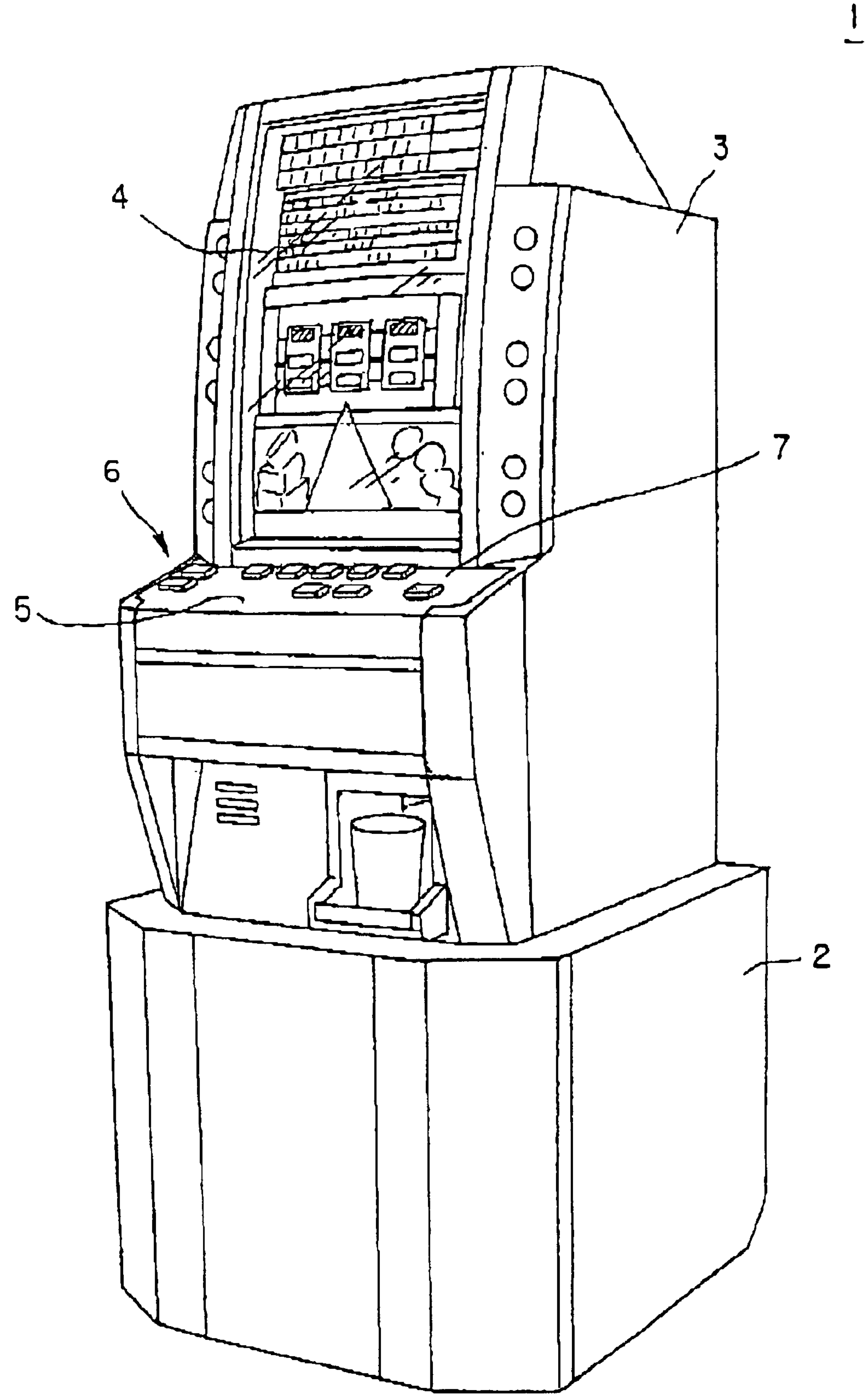
FIG. 1 is a perspective view showing the appearance of an arcade game machine related to an embodiment of the present invention.
Figure 2:
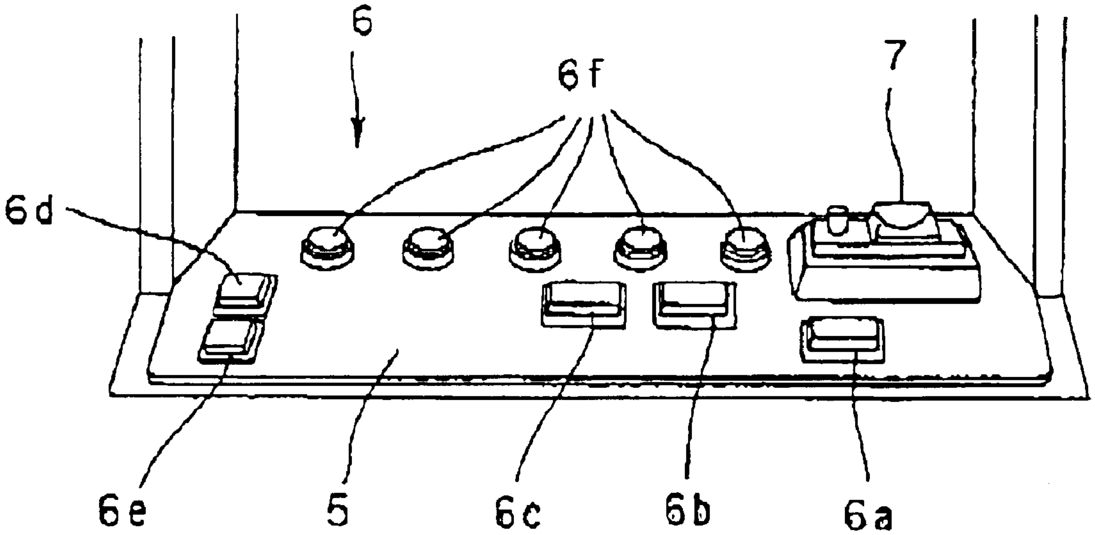
FIG. 2 is a view showing the details of a control panel fixed on the arcade game machine in FIG. 1.

FIG. 1 shows the appearance of a game system to which the present invention is applied. This game system is constituted as an arcade game machine 1 installed in game centers, etc. The game system comprises a base 2, a housing 3 placed on the base 2, and a monitor 4 as a display unit installed in the upper portion of the housing 3. The monitor 4 is composed of a CRT with its longitudinal direction fixed in the vertical direction. A control panel 5 is provided in the lower front portion of the housing 3. The control panel 5 has an input unit 6 and a medal slot 7. As shown in FIG. 2, the input unit 6 is provided with a plurality of operation buttons 6*a* through 6*f* which function as push button switches. The number of the buttons and their positions can be decided freely. In the example shown in FIG. 2, a deal/draw/double button 6*a*, a max bet button 6*b*, a one-bed button 6*c*, a half double button 6*d*, a collect/pay out button 6*e*, and hold buttons 6*f* . . . 6*f* are prepared.

Figure 3:
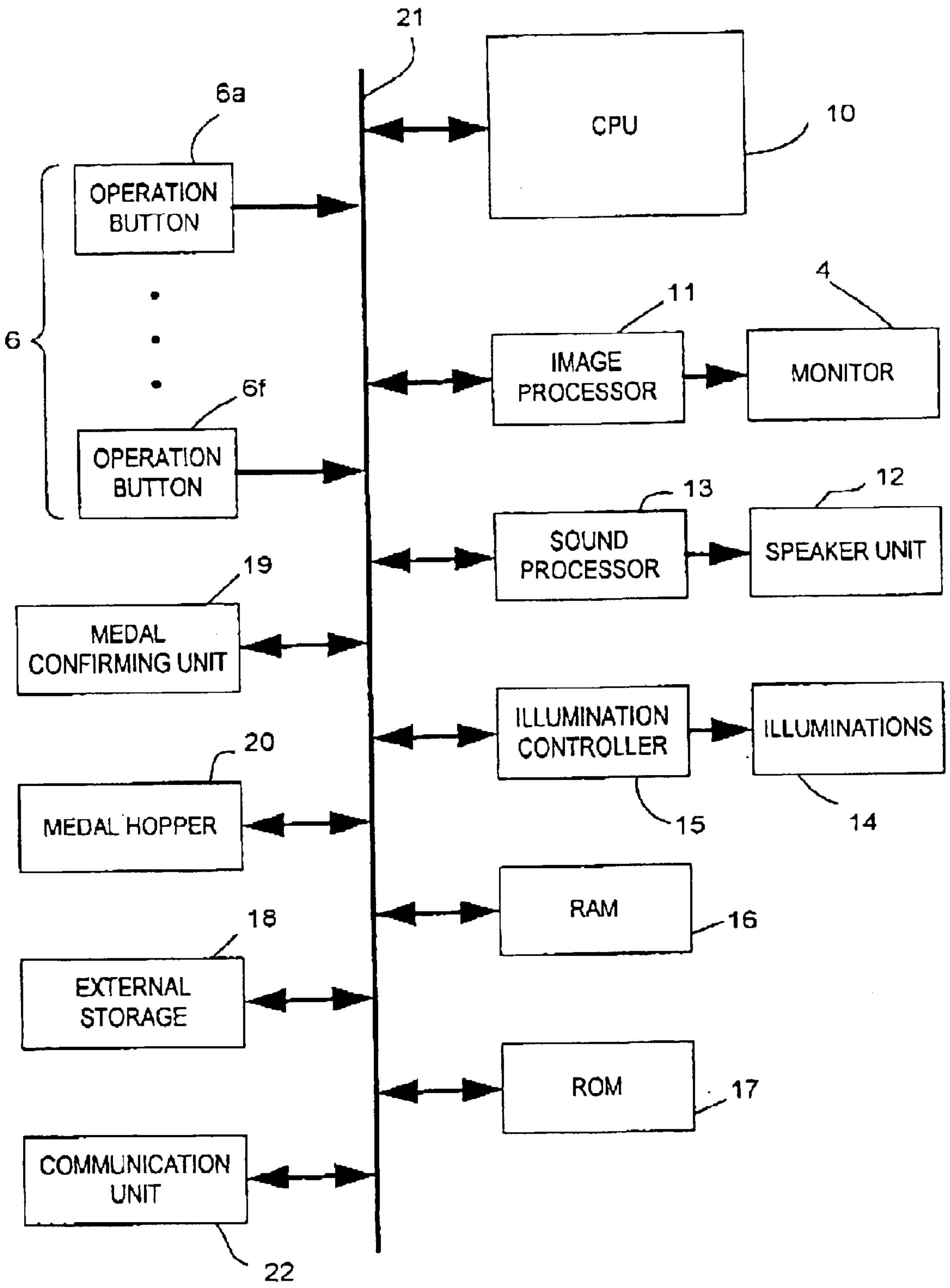
FIG. 3 is a block diagram illustrating a constitution of a control system provided in the arcade game machine of FIG. 1.

FIG. 3 shows a constitution of a control system installed in the game machine 1. The game machine 1 has a CPU 10 for performing various calculations and operation controls necessary for advancing a game. The CPU 10 is electrically connected through a bus 21 with an image processor 11 for drawing a desired image on the monitor 4 according to the instruction of the CPU 10, a sound processor 13 for supplying a desired sound through a speaker unit 12 according to the instruction of the CPU 10, an illumination controller 15 for controlling the flash of illuminations 14 of the game machine 1 according to the instruction of the CPU 10, a RAM 16, a ROM 17, and an external storage 18 as storing device, a medal confirming unit 19 for discriminating the validity of medals which are put in from the medal slot 7 of the housing 3 (referred to FIG. 1), and a medal hopper 20 for storing the valid medals and paying out the number of medals according to the instruction of the CPU 10. A program and data necessary to control the basic operation at the activation of the game machine 1 are written in the ROM 17. The external storage 18 has a magnetic, an optical or a photo-electro-magnetic storing medium. A program and data necessary to execute a predetermined card game on the screen of the monitor 4 are stored in the storage medium. Alternatively, the external storage 18 may be omitted, and a game program and data may be recorded in the ROM 17.

The CPU 10 is also connected with each operation buttons 6*a* to 6*f* of the input unit 6 through the bus 21. The CPU 10 is further connected with a communication unit 22 through the bus 21. Input/output interfaces are installed in the connected portion of the bus 21 and the above-mentioned respective units, depending on necessity. They are not illustrated here.

The communication unit 22 is installed between the game machine 1 and a progressive unit, not illustrated, in order to exchange information there between to control pay out and storage of a progressive bonus. Namely, a plurality of game machines including the game machine are connected with the progressive unit. The respective game machines inform the progressive unit of the number of the bet medals. The progressive unit stores a certain ratio on the number of the informed medals as a progressive bonus and informs the respective game machines of the number of the stored medals. When the terms of payment for the progressive bonus are satisfied in some game machine, the progressive unit gives an instruction to pay out the progressive bonus to the game machine. The game machine which received the instruction pays out the number of the medals permitted as the progressive bonus.

The CPU 10 of the game machine 1 can optionally execute several kinds of card games according to a game program stored in the external storage 18 (or the ROM 17). FIGS. 4 to 7 are flow charts respectively showing the procedure of the CPU 10 when one of the card games is selected. FIGS. 8 to 12 respectively show a screen example displayed on the monitor 4 in the card game. The basic procedure of the card game done here is as follows.

Figure 8:
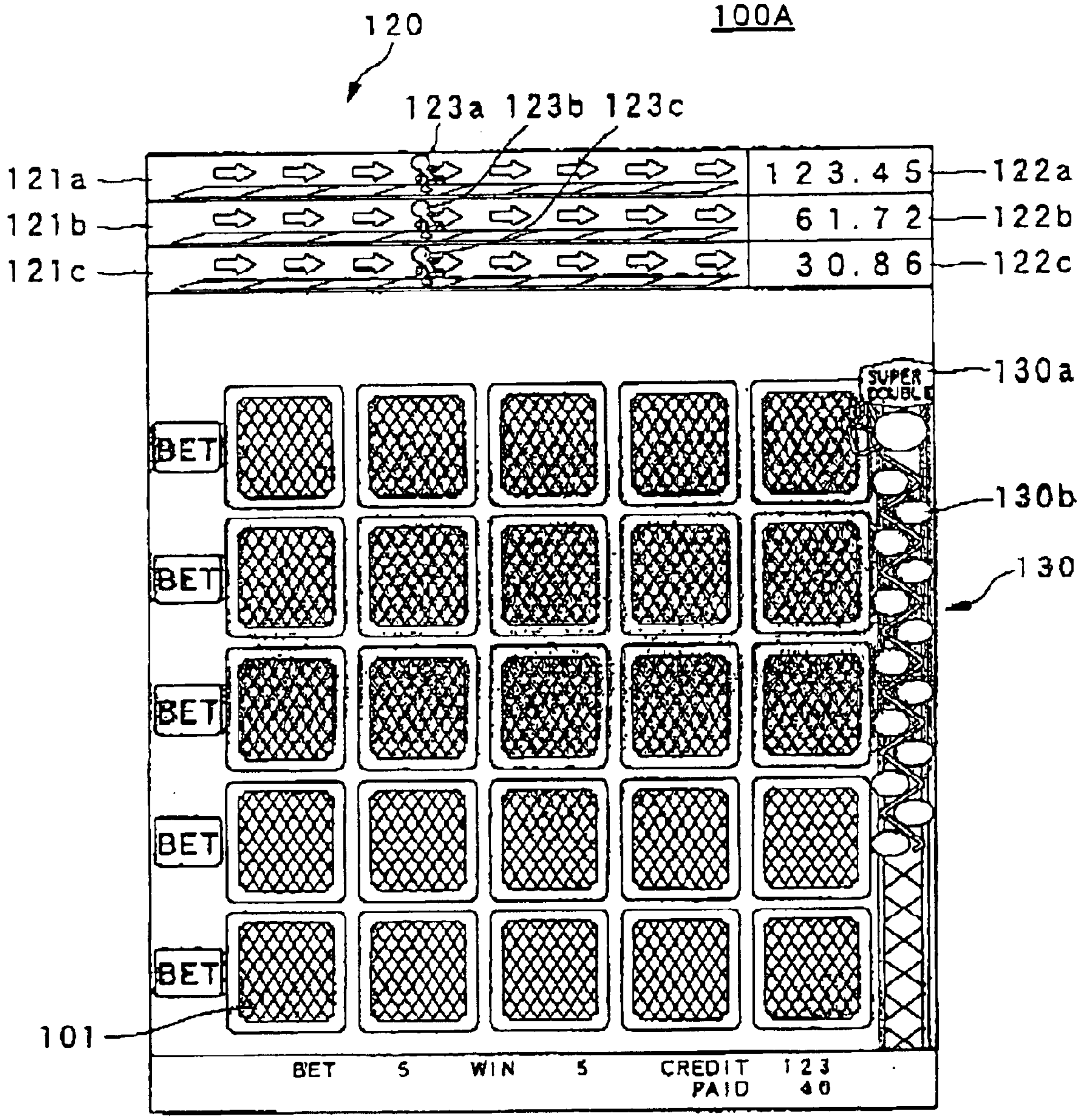
FIG. 8 is a view showing a screen of a poker game displayed on the monitor in the game processing of FIG. 4.

First, when the game starts, a poker game screen 100A as shown in FIG. 8 is displayed on the monitor 4. On the poker game screen 100A, 25 pieces of cards 101 . . . 101 are turned face down and arranged in a matrix pattern of five cards square. One bet line consists of five cards lying horizontally. The screen includes five lines in total. When a player bets one medal, the bottom line is set as an effective line. Every time one medal is added, the effective line is increased one by one upwardly. When the number of the bets reaches five, all of the lines are set as the effective lines. The state where the number of the bets is five is called "max bet".

Figure 9:
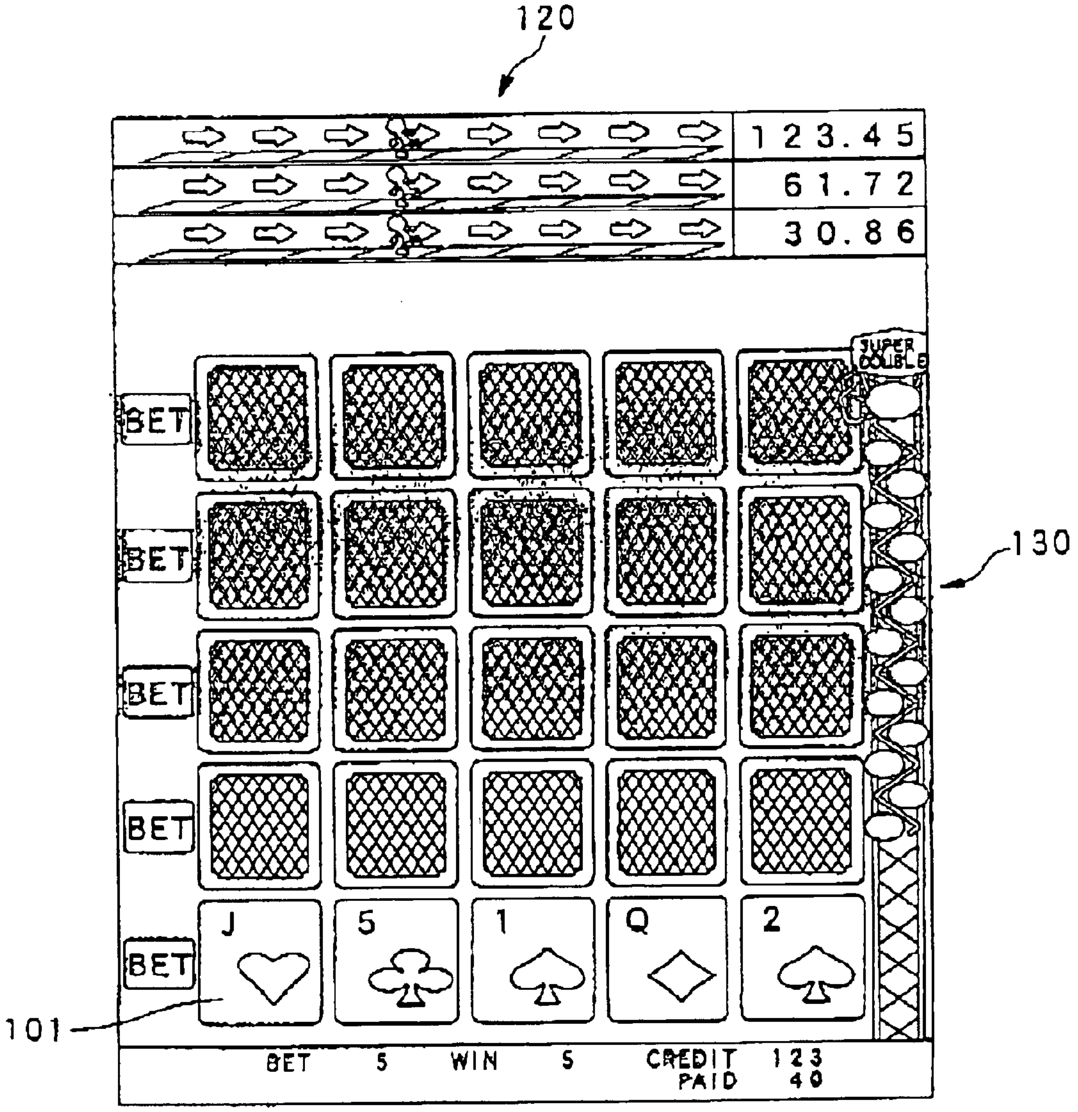
FIG. 9 is a view showing the state in which the cards in the bottom line are turned over from the state shown in FIG. 8.
Figure 10:
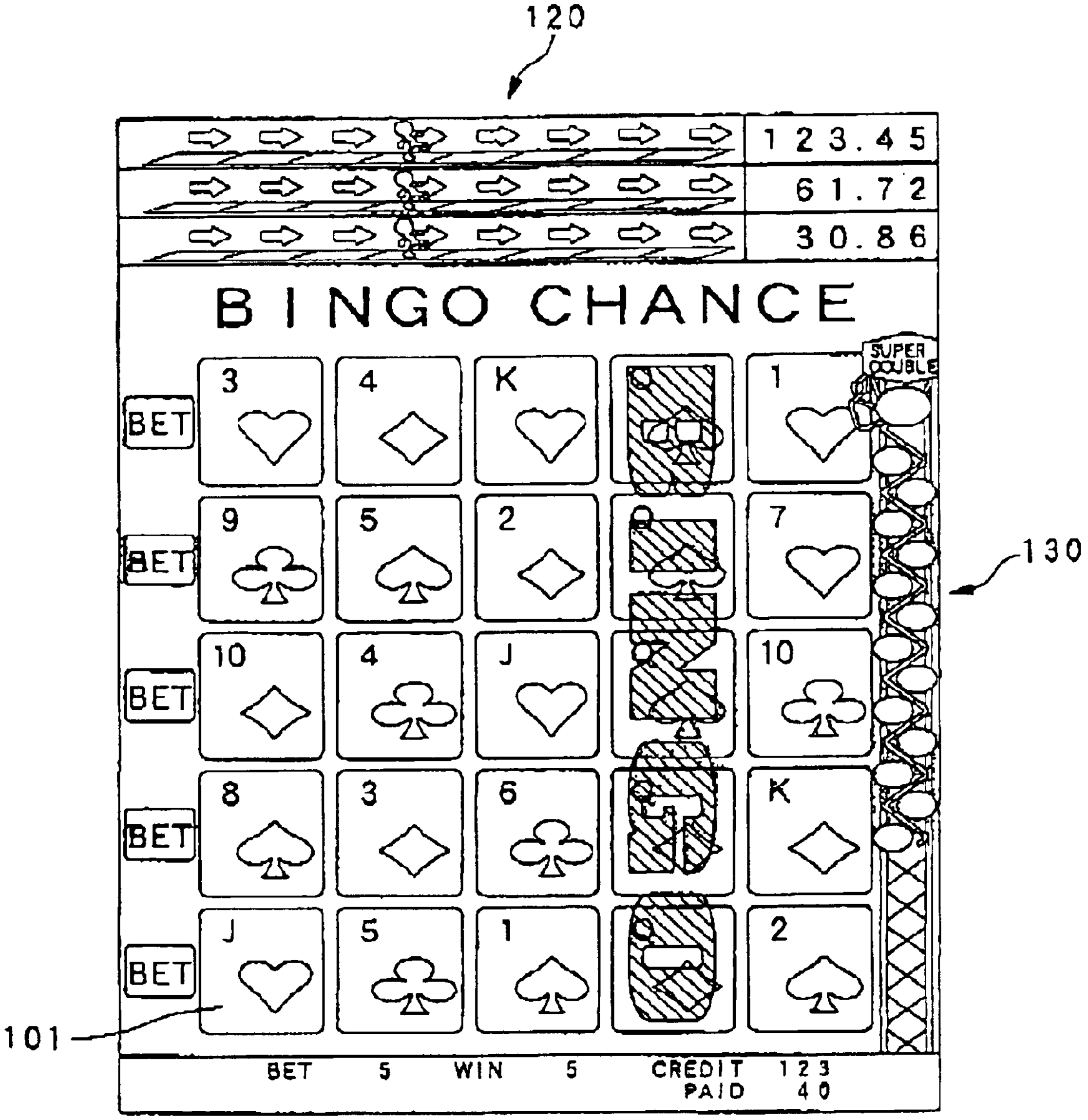
FIG. 10 is a view showing the state in which the cards in all lines are turned over from the state shown in FIG. 8.
Figure 11:
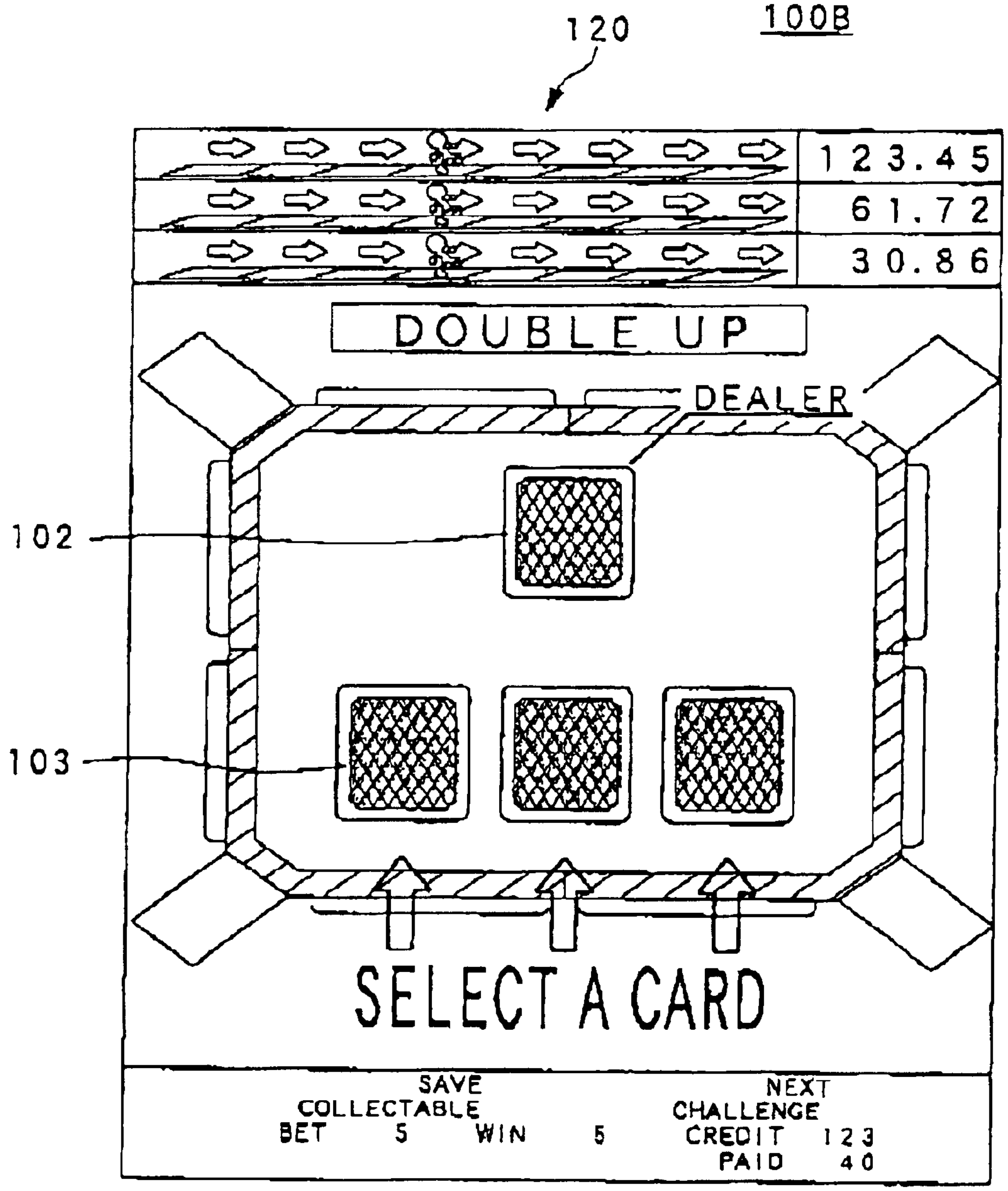
FIG. 11 is a view showing the screen of the double-up game displayed on the monitor in the processing of the double-up game of FIG. 6.
Figure 12:
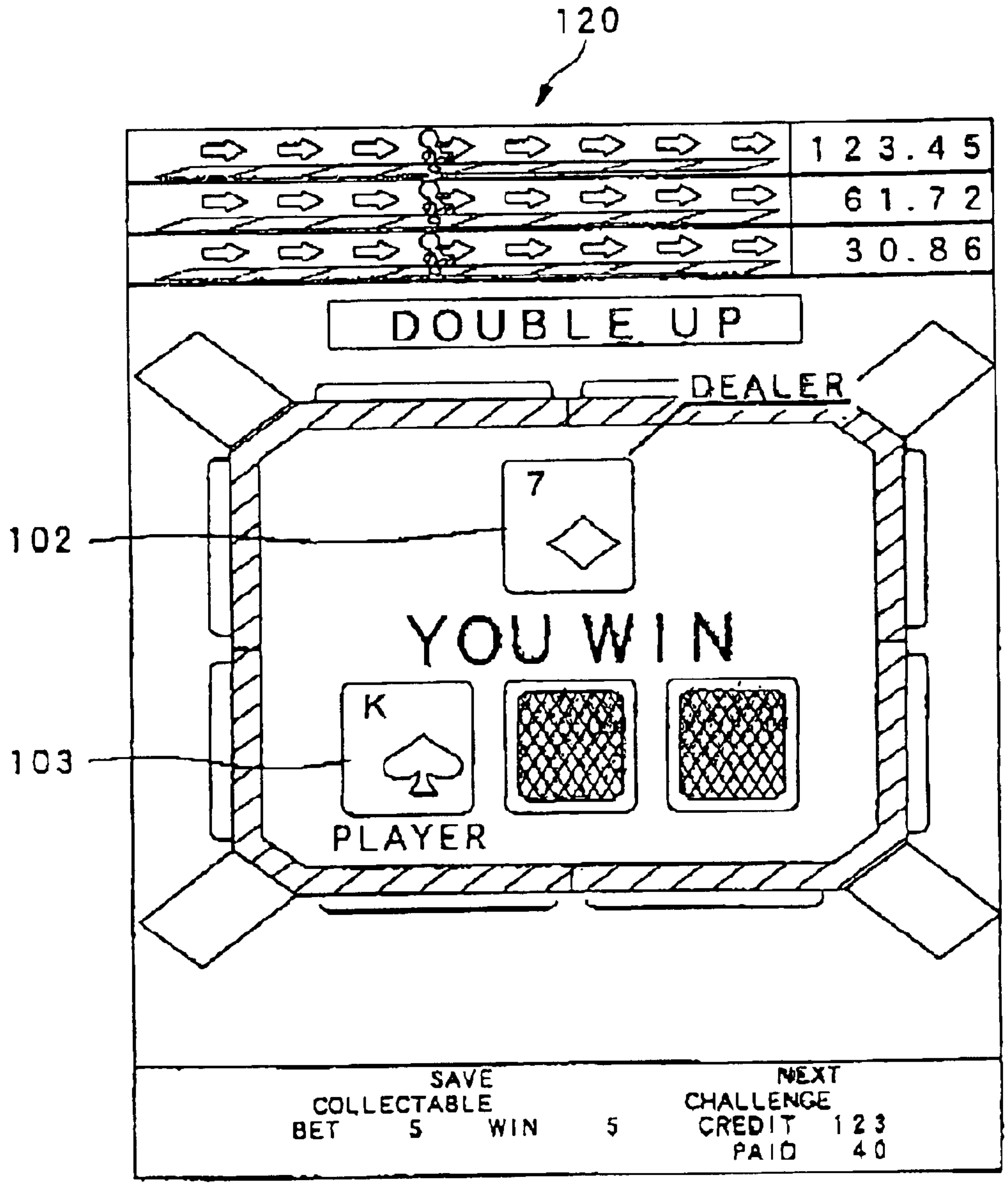
FIG. 12 is a view showing the state in which both a card of a dealer and a card chosen by a player are turned over from the state shown in FIG. 11.

When the betting is completed, the cards 101 in the effective lines are turned face up (refer to FIGS. 9 and 10). When two pairs or a special combination of much more points than the pairs is gained in the poker games in any effective line, a player wins. The number of the medals depending on the successful hand is set up as a dividend. The player is given a right to proceed to the double-up game Although there is also a case where a player can proceed to a super double-up game instead of the double-up game, it will be described later. If a player wants to receive the dividend, the dividend is divided, without executing the double-up game. When a player desires the double-up game, a double-up game screen 1003 shown in FIG. 11 appears to start the double-up game. In the double-up game, one card 102 is delivered to a dealer, and three cards 103 . . . 103 are delivered to a player, when the player selects one of the three cards 103, the selected card 103 and the dealer's card 102 are turned face up (FIG. 12). If the card 103 selected by the player is larger than the dealer's card 102, the player wins. At this point, the predetermined number of the medals to be shared is doubled when the player loses the double-up game, the dividend is confiscated. The double-up game can be executed repeatedly. When a Player loses or wants to receive the dividend, the double-up game is ended, and the player returns to the poker game using 25 pieces of cards.

Various ideas for enhancing the fun of the game are devised other than the above procedure, and they are described with reference to the flow charts of FIGS. 4 to 7.

Figure 4:
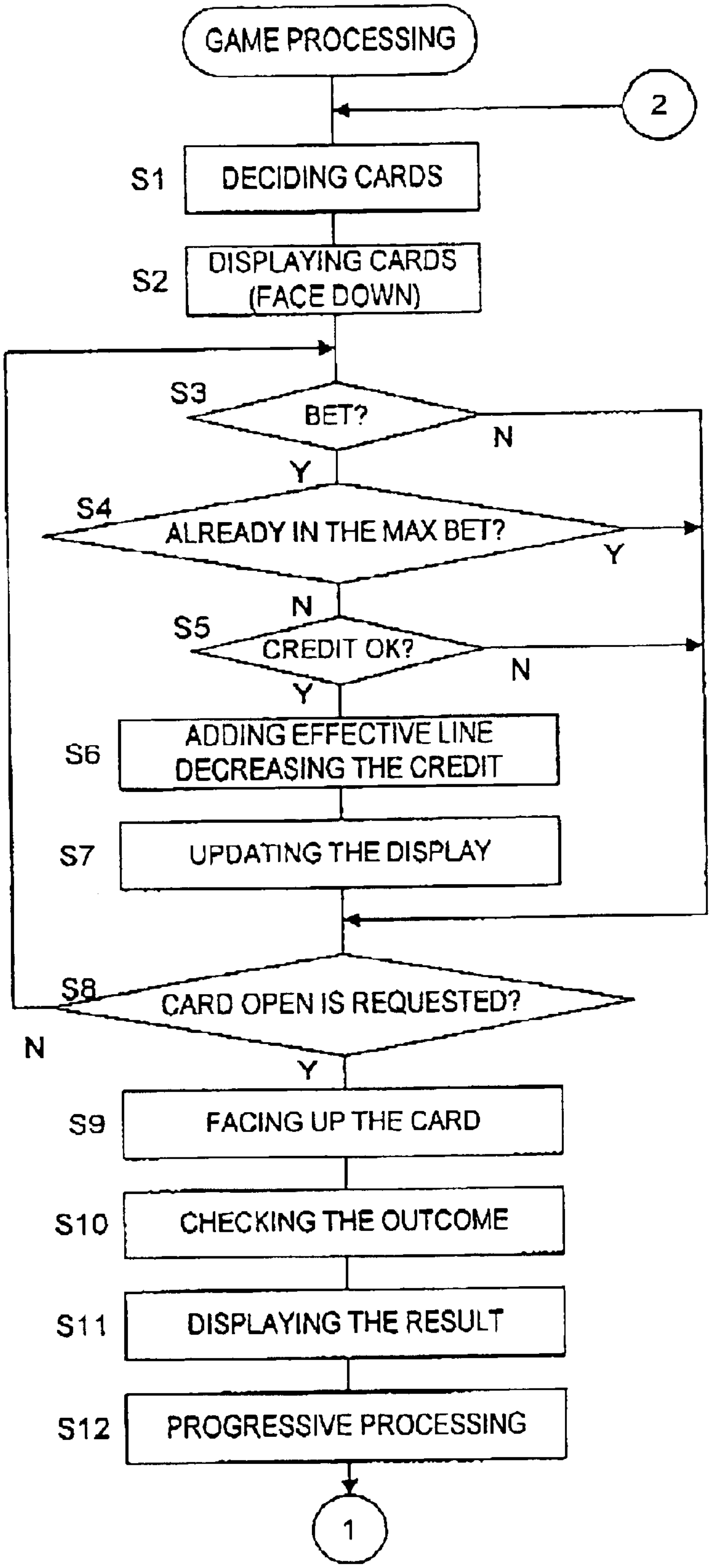
FIG. 4 is a flow chart showing the procedure of the game processing executed by the CPU of FIG. 3.

When a predetermined game starting operation is performed on the game machine 1, the CPU 10 starts the game processing of FIG. 4. Every time the medal confirming unit 19 supplies a signal indicating that a valid medal has been put in there, the CPU 10 adds one to the number of a credit stored in the RAM 16 (the number of the medals held by a player).

In the game processing of FIG. 4, 25 pieces of the cards 101 to be displayed on the monitor 4 are selected. Simultaneously, their positions are decided by the CPU 10 (Step S1). The poker game uses a total of 53 cards including one joker and the four suits; hearts, diamonds, clubs, and spades respectively consisting of 13 cards. In Step S1, 25 cards are selected therefrom. When a game is executed in a probability fluctuation mode described later, the number of the joker cards is changed to two and 25 cards are selected from a total of 54 cards. In any case, a random number is used for selection and arrangement of the cards. A probability of selecting each card is evenly set in the four suits. The joker is treated as a wild card that can be used as any of the four suits. Accordingly, a probability of completing a successful hand is increased in the probability fluctuation mode.

In the following Step S2, the selected 25 cards are displayed on the screen of the monitor 4. Whether or not a player performs a predetermined bet operation (push operation of the one bet button 6*c* or the max bet button 6*b*) in the input unit 6 is discriminated (Step S3). When there is the bet operation, whether it is in a state of the max bet or not is discriminated with reference to the number of the bets recorded in the RAM 16 (Step S4). When it is not in the state of the max bet, whether the number of the medals in accordance with the number of the bets has been credited or not is discriminated with reference to the credit number recorded in the RAM 16 (Step S5).

When the credit number is satisfied, the effective line is increased by the number corresponding to the number of the added bets. Simultaneously, the number of the added bets is subtracted from the credit number (Step S6). The display about the number of the bets, the number of the effective lines, and the credit number on the poker game screen 100A is updated to the latest information recorded in the RAM 16 (Step S7).

Whether or not a player has performed an operation for opening the card (push operation of the button 6*a*) in the input unit 6 is checked (Step S8). When it proves that there is no such operation, this step will be returned to Step S3. When it is judged to be in the max bet state in Step S4, or when it is judged that the credit number is short in Step S5, Step S6 and Step S7 are omitted and the processing is advanced to Step S8.

When it is judged that the card open has been requested in Step S8, the state of facing up the cards 101 on the effective line, of the cards 101 displayed on the game screen 100A, is represented on the monitor 4 (Step S9). FIG. 9 shows the case where the effective line is one, and FIG. 10 shows the case where the effective line is five. In FIG. 10, a bingo described later is completed in the vertical line at the second from the right, and the character "BINGO" indicating the above to a player is overlapped on the cards.

In the following Step S10, the game achievement is judged, according to the content and collocation of the selected cards in Step S1 and the number of the effective lines stored in the RAM 16, and the judged result is displayed on the monitor 4. In Step S10, at least the following matters are discriminated;

(1) whether or not one successful hand and more is established on each effective line, (2) whether or not the bingo is completed in the five cards lying in a vertical and a diagonal direction (where, it is limited to the cards on the effective lines), (3) whether or not a mark associated with a progressive bonus is attached to each card on the effective line.

As for the above (1), the type of a successful hand and the odds for each successful hand are decided according to the actual rule of the poker. The bingo of (2) is established for the purpose of producing a possibility of a dividend there, in addition to the combination of the cards on the effective lines. For example, such a state that the five cards of the same number or the same suit (mark) are lying in the vertical direction or the diagonal direction is set as the bingo in the state other than the max bet, since the cards on one line and more are turned face down, the bingo is never completed in the case other than the max bet. The above (3) is established in order to pay out a progressive bonus.

As apparent from FIGS. 8 to 12, a bonus information display window 120 for displaying the information on a progressive bonus is provided in the upper end portion of the game screens 100A and 100B, where three lines of gauges 121*a* to 121*c* and counters 122*a* to 122*c* corresponding to the respective gauges 121*a* to 121*c* are provided. The progressive game system including the game machine 1 controls the pay of the progressive bonus in three stages depending on the winning probability. The gauge 121*a* and the counter 122*a* in the uppermost of the bonus information display window 120 correspond to the highest ranking hand with the lowest winning probability. The gauge 121*c* and the counter 122*c* in the lowest portion correspond to the lower ranking hand with the highest winning probability. The gauge 121*b* and the counter 122*b* in the middle portion correspond to the medium ranking hand with the medium winning probability. The amount of the progressive bonus (the number of the medals) in the case of the current highest ranking hand, medium ranking hand, lower ranking hand notified from the progressive unit is respectively displayed on the counters 122*a* to 122*c*.

The respective gauges 121*a* to 121*c* are classified by color, for example, into red, yellow, and blue. Inside the gauges, characters 123*a* to 123*c* are displayed to show the remaining pieces to the finals. The initial position of the respective characters 123*a* to 123*c* is set at the left end portion of the respective gauges 121*a* to 121*c*. When the th cards are selected in Step S1, the CPU 10 shares the symbol marks respectively represented in the same color as each color of the respective gauges 121*a* to 121*c* on some of the 25 cards at a predetermined probability. The probability at this time is in proportion to the winning probability. In Step S10, whether the symbol marks are disposed on the effective line or not is discriminated.

In Step S12, the processing on the pay of the progressive bonus is performed depending on the discrimination result of Step S10, as follows. Namely, if a symbol mark is disposed on the effective line, the character 123*a*, 123*b*, or 123*c* of the gauge 121*a*, 121*b*, or 121*c* corresponding to the symbol is advanced to the right by one piece. If the character 123*a*, 123*b*, or 123*c* reaches the right end of the gauge 121*a*, 122*b*, or 12*c*, the progressive bonus as for the gauge 121*a*, 121*b*, or 121*c* is gained. Then, the number of the medals displayed on the counter 122*a*, 122*b*, or 122*c* is paid out as the progressive bonus. In this case, the number of the medals corresponding to the progressive bonus may be actually paid out, or the same number may be added to the credit number. Alternatively, a receipt describing the progressive bonus may be issued. When the progressive bonus is paid out, the winning character 123*a*, 123*b*, or 123*c* of the gauge 121*a*, 121*b*, or 121*c* is returned to the initial position.

Figure 5:
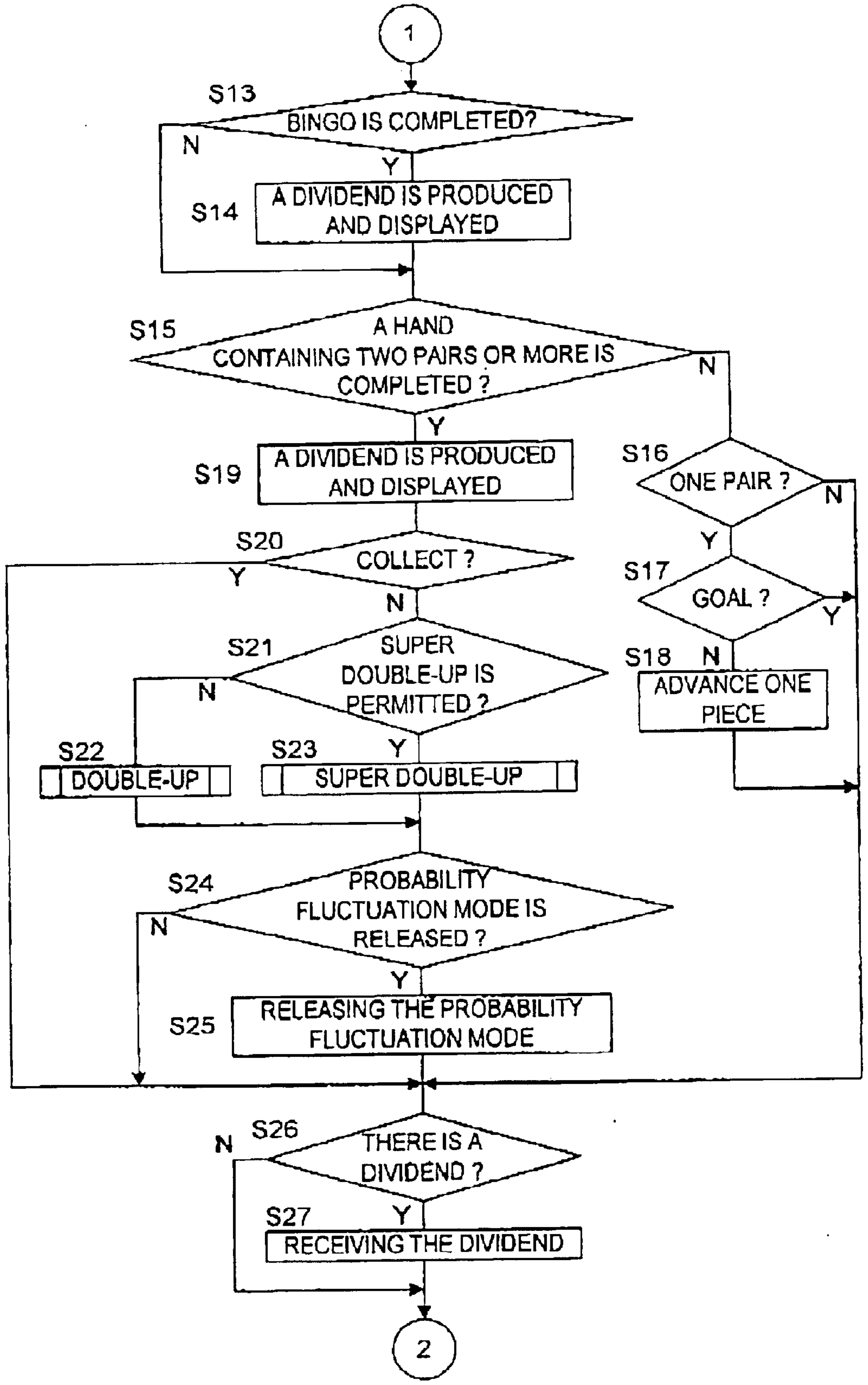
FIG. 5 is a flow chart continued from the FIG. 4.

When the processing about the progressive bonus is completed, the processing is advanced to Step S13 of FIG. 5 continuously. In Step S13, whether the bingo is completed or not is discriminated according to the discrimination result of Step S10. When it is established, the number of the medals assigned as the bingo is recorded in the RAM 16 as a dividend. The number of the divided medals is displayed on the monitor 4 (Step S14). When the bingo is not completed, Step S14 is omitted.

In the following Step S15, whether or not a hand containing two pairs or more is gained on any effective line is discriminated, according to the discrimination result of Step S10. When it is not gained, whether or not a hand containing one pair is gained on any effective line is discriminated (Step S16). When the hand containing one pair is gained, whether or not the gauge 130 has already arrived at a goal is discriminated, with reference to the number or pieces of the gauge 130 (refer to FIG. 8) for the super double-up game recorded in the RAM 16 (Step S17). A goal lamp 130*a* indicating a goal and a plurality of piece lamps 130*b* . . . 130*b* ranging below the goal lamp 130*a* are provided in the gauge 130. One lamp 130*b* represents one piece. Every time one pair is established, the number of the pieces recorded in the RAM 16 is increased by one after another. Simultaneously, the lamp 130*b* is lit on one by one from the bottom of the gauge 130 (Step S18). The gauge 130 arrives at the goal by lighting on the goal lamp 130*a*.

When it is judged that the hand containing two pairs is completed in Step S15, the processing is advanced to Step S19, where the odds set according to the successful hand and the number of the medals depending on the bets are recorded in the RAM 16 as the dividend. The amount of the dividend is displayed on the monitor 4. When the dividend for the bingo has been already recorded there, the sum of the same dividend and the dividend corresponding to the successful hand is recorded into the RAM 16 as the dividend.

In Step S20, it is confirmed whether a player wants to receive (collect) the dividend or proceed to the double-up game. For example, a screen asking a player whether he or she wants to proceed to the double-up game is displayed on the monitor 4, and when the collect/pay-out button 6*e* is pushed, reception of the dividend is selected. When the deal/draw/double button 6*a* is pushed, it is judged that the double-up game is selected.

When the double-up game is selected, the processing is advanced to Step S21. Based on the number of the pieces of the gauge 130 recorded in the RAM 16, whether the super double-up game is permitted or not is discriminated. When the gauge 130 arrives at the goal, the super double-up game is permitted. When it does not arrive at the goal, the super double-up game is prohibited. When the super double-up game is prohibited, the double-up game is executed (Step S22). When the super double-up game is permitted, it is executed (Step S23). When one of these games is completed, the processing is advanced to Step S24, where whether or not the condition of releasing the probability fluctuation mode is satisfied is discriminated. For example, after moving to the probability fluctuation mode, when the successful hand containing two pairs or more is completed for a predetermined number of the times, it is judged that the condition of releasing the probability fluctuation mode has been satisfied. When it is judged positively in Step S24, the probability fluctuation mode is released in Step S25. When it is judged negatively in Step S24, Step S25 is omitted.

In Step S26, whether or not the dividend is recorded in the RAM 16 is discriminated, and when there is the dividend, it is executed (Step S27) the dividend may be executed by adding the credit or paying the medals. When it is judged that a player wants to collect the dividend in Step S20, when it is judged that the gauge 130 has arrived at the goal in Step S17, and when it is judged that the gauge 130 is advanced by one piece in Step S18, the processing is advanced to Step S26.

Figure 6:
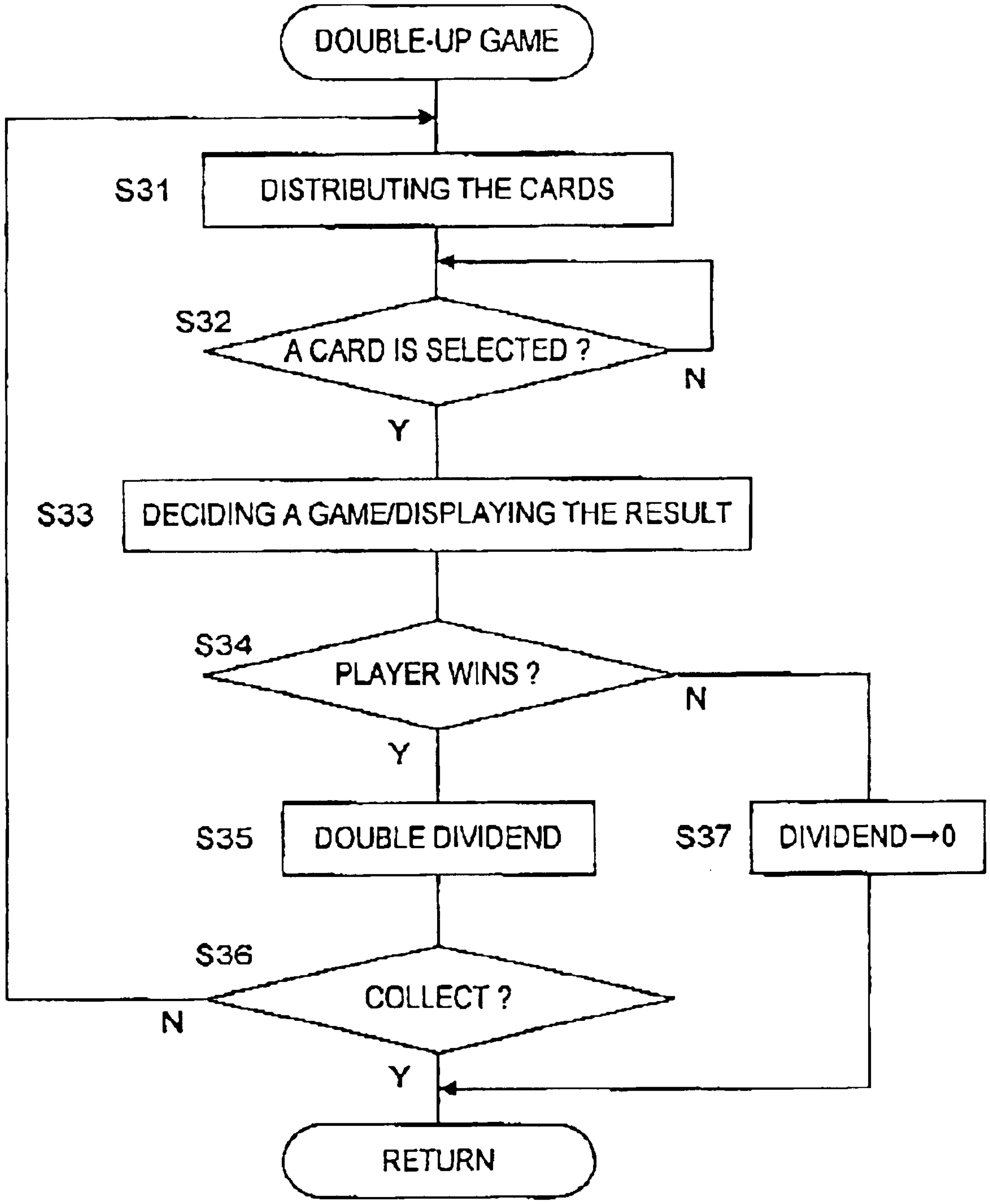
FIG. 6 is a flow chart showing the procedure of the double-up game processing executed as a sub-routine of FIG. 5.

FIG. 6 is a flow chart showing the processing procedure of the CPU 10 when the double-up game is performed. When the double-up game starts, the CPU 10 decides one card 102 for a dealer and three candidate cards 103 for a player's selection (Step S31). Simultaneously, the game screen 100B shown in FIG. 11 is displayed on the monitor 4. Further, video of dealing the cards face down is displayed. Then, whether or not a player selects one of the three cards 103 is judged(Step S32). For example, three hold buttons 6*f* are used for this selection of a card.

When a card is selected, the outcome of the game is decided by comparison between the number of the player's card 103 and the dealer's card 102. An image depending on the outcome is displayed on the monitor 4 (Step S33). FIG. 12 shows an image when a player wins. In Step S34, whether a player wins or not is confirmed. When a player wins, the dividend recorded in the RAM 16 is increased to the double (Step S35). Thereafter, whether or not a player wants to receive the dividend is discriminated (Step S36). When he or she does not do it, the processing is returned to Step S31, where the next game is started. When he or she wants to receive it, the double-up game is completed and the processing is advanced to Step S24 of FIG. 5. When it proves that a player loses the game, the dividend is confiscated, that is, changed to zero (Step S37). Thereafter, the double-up game is completed and the processing is advanced to Step S24 of FIG. 5.

Figure 7:
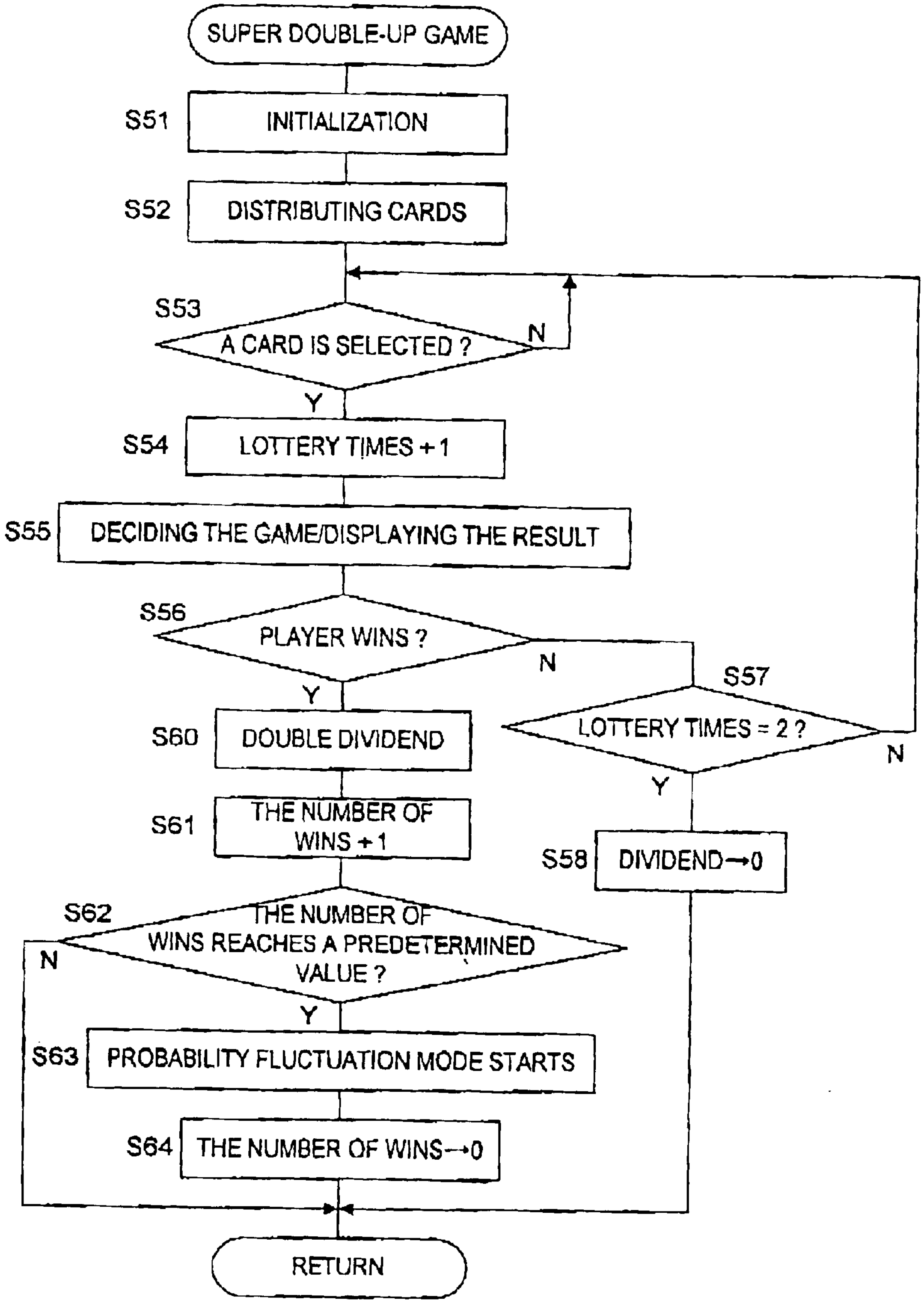
FIG. 7 is a flow chart showing the procedure of super double-up game processing executed as a sub-routine of FIG. 5.

FIG. 7 is a flow chart showing the procedure of processing of the CPU 10 when the super double-up game is performed. When the super double-up game is started, the number of the lottery times recorded in the RAM 16 is reset at zero as the initialization processing. The number of the pieces of the gauge 130 is reset at zero (Step S51). Continuously, one card 102 for a dealer and three candidate cards 103 for a player are decided (Step S52). The same screen as the game screen 100B shown in FIG. 11 is displayed on the monitor 4. Further, video of dealing the cards face down is displayed. Whether or not a player selects one of the three cards 103 is checked (Step S53).

When a card is selected, one is added to the number of the lottery times (Step S54). Thereafter, the outcome of the game is decided by comparison between the number of the player's selected card 103 and the dealer's card 102. An image depending on the outcome is displayed on the monitor 4 (Step S55). In Step S56, whether a player wins or not is confirmed. When a player loses the game, whether or not the number of the lottery times recorded in the RAM 16 reaches two is discriminated (Step S57). When it is judged that the number of the lottery times does not reach two, the processing is returned to Step S53. While, when the number of the lottery times is two, the dividend recorded in the RAM 16 is confiscated, that is, changed to zero (Step S58). Thereafter, the double-up game is completed and the processing is advanced to Step S24 of FIG. 5. Accordingly, in the super double-up game, a player can select two of the three cards 103, and the probability of win is increased more than the double-up game.

When the player's win is confirmed in Step S56, the dividend recorded in the RAM 16 is changed to the double (Step S60). Continuously, one is added to the number of win in the super double-up game recorded in the RAM 16 (Step S61), and whether or not the number of wins reaches the predetermined number is discriminated (Step S62). When it reaches the predetermined number, the probability fluctuation mode is started (Step S63). Then, the number of wins recorded in the RAM 16 is reset at zero. Thereafter, the double-up game is completed and the processing is advanced to Step S24 of FIG. 5. When it is judged that the number of wins does not reach the predetermined number, the processing of Step S63 and S64 is omitted and the double-up game is completed.

The present invention is not restricted to the above-mentioned embodiment, but various modifications are possible. When a bingo is formed, the odds (delivery ratio of medals) for the successful hand on the effective line may be changed correspondingly to it various games other than a poker may be executed as the card game. The card is not restricted to a trump card, but a karuta or a traditional Japanese playing card, and the like may be used as far as it can form a successful hand by combination of some cards. The present invention may be adopted not only to an arcade game machine but also to a domestic video game machine, a game system using a network, and the like. According to the present invention, it is not restricted to the case of producing a dividend by completing a bingo, but there may be the case of decreasing the dividend when a specified combination is formed in a direction different from the effective line. Even when the number of bets is less than the max bet, a dividend may be controlled in consideration of the combination in a direction different from the effective line. A dividend may be changed when a specified combination is formed repeatedly in a direction different from the line.

Although, in the above embodiment, the CPU, as a game-controller, works as card deciding device, betting device, dividend controlling device, selecting device, dividend increase controlling device, judging device, and probability controlling device by combination with specified software, one of these device or all of them may be replaced with a logic circuit in combination of IC or LSI.

As set forth herein above, according to the present invention, with a plurality of cards placed in a matrix shape, a dividend is controlled, according to the combination of the cards on a line set in a specified direction of the matrix as well as according to the combination of the cards in a direction different from the line.

Accordingly, the present invention can enhance a player's fun of a game by adding surprise and accidental performance to a game without impairing easiness of a game.

What is claimed is:

1. A game system comprising:

a display unit for displaying a game screen;

an input unit for supplying a signal corresponding to a player's operation; and a game controller for executing a predetermined card game using trump cards on the game screen of the display unit with reference to the signal supplied from the input unit, wherein the game controller includes:

a card deciding device for deciding a plurality of cards to be displayed on the game screen in a matrix, a betting device for setting a number of lines of a plurality of lines formed by the cards arranged in a predetermined direction on the game screen, each of the set lines being an effective line, the number of effective lines being set depending on the value of a play which a player sets by operating the input device, the betting device increasing the number of effective lines as the play value increases, and a dividend controlling device for controlling a dividend for the player according to a combination of the cards on any of the effective lines and a combination of the cards in a direction different from the direction of the effective lines, wherein the effective lines being set in only one direction of the matrix, and the dividend controlling device being arranged to produce the dividend when a successful hand is formed on any of the effective lines in the card game using the trump cards, and also to produce the dividend or change a previously produced dividend when a maximum number of the effective lines in the matrix are selected and a predetermined combination is formed by the cards on the maximum number of the effective lines at least in a diagonal direction or in a direction perpendicular to the effective lines.

2. The game system according to claim 1, wherein the dividend controlling device is arranged to produce the dividend or change the previously produced dividend when a predetermined number of the cards of the same mark or the cards of the same number is placed at least in the diagonal direction or in the direction perpendicular to the effective lines.

3. The game system according to claim 1, further comprising:

a selecting device for selecting reception of the dividend or a chance of increasing the dividend when the dividend controlling device produces the dividend according to a player's instruction given by the input unit; and a dividend increase controlling device for increasing the dividend when an outcome of the game satisfies a predetermined condition while performing a predetermined game, when the above chance is selected.

4. The game system according to claim 3, further comprising:

a discriminating device for checking whether or not to advance the count associated with a chance of increasing the dividend based on the outcome of the game every time a game using a plurality of the cards placed in the matrix is performed; and a probability controlling device for increasing a probability of achieving the outcome satisfying the predetermined condition in the game performed by the dividend increase controlling device when the dividend controlling device produces the dividend as the above count reaches a predetermined value.

5. The game system according to claim 4, wherein the dividend increase controlling device makes the player select a predetermined number of the cards from the plurality of the cards in the game, and executes the game for deciding victory or defeat according to whether the selected cards satisfy a predetermined condition or not, and the probability controlling device increases the probability by increasing the number of the cards selectable by the player.

6. The game system according to claim 1, wherein the game controller is arranged to form the matrix as a two-dimensional matrix having a vertical direction and a horizontal direction and to set the effective lines only in the horizontal direction.

7. The game system according to claim 6, wherein the dividend controlling device is arranged to produce the dividend or change the previously-produced dividend when the maximum number of the effective lines in the matrix are selected and the predetermined combination is formed by the cards on the maximum number of the effective lines in the diagonal direction or in the vertical direction.

8. The game system according to claim 1, wherein the game controller is arranged to form the matrix as a two-dimensional matrix having a vertical direction and a horizontal direction, and set the effective lines only in the vertical direction.

9. The game system according to claim 8, wherein the dividend controlling device is arranged to produce the dividend or change the previously-produced dividend when the maximum number of the effective lines in the matrix are selected and the predetermined combination is formed by the cards on the maximum number of the effective lines in the diagonal direction or in the horizontal direction.

10. The game system according to claim 1, wherein the dividend controlling device is arranged to produce the dividend when a maximum number of the effective lines in the matrix are selected and a predetermined combination is formed by the cards on the maximum number of the effective lines in the diagonal direction or in the direction perpendicular to the effective lines.

11. The game system according to claim 1, wherein the dividend controlling device is arranged to change the previously-produced dividend when the maximum number of the effective lines in the matrix are selected and the predetermined combination is formed by the cards on the maximum number of the effective lines in the diagonal direction or in the direction perpendicular to the effective lines, the previously-produced dividend being produced based on a successful hand being formed on one or more of the effective lines.

12. The game system according to claim 11, wherein the dividend controlling device is arranged to increase the previously-produced dividend when the maximum number of the effective lines in the matrix are selected and the predetermined combination is formed by the cards on the maximum number of the effective lines in the diagonal direction or in the direction perpendicular to the effective lines.

13. The game system according to claim 1, wherein the dividend controlling device is arranged to produce the dividend or change the previously produced dividend when the maximum number of the effective lines in the matrix are selected and the predetermined combination is formed by the cards on the maximum number of the effective lines in the diagonal direction.

14. The game system according to claim 1, wherein the dividend controlling device is arranged to produce the dividend or change the previously produced dividend when the maximum number of the effective lines in the matrix are selected and the predetermined combination is formed by the cards on the maximum number of the effective lines in the direction perpendicular to the direction of the effective lines.

15. A game controlling method for executing the following procedures by a computer provided in a game system:

a procedure of deciding a plurality of trump cards displayed on a game screen in a matrix, a procedure of setting a number of lines of a plurality of lines formed by the cards arranged in a predetermined direction on the game screen, each of the set lines being an effective line, the number of effective lines being set depending on the value of a play which a player sets by operating the input device, the betting device increasing the number of effective lines as the play value increases, and a procedure of controlling a dividend for the player according to a combination of the cards on any of the effective lines and a combination of the cards in a direction different from the direction of the effective lines, wherein the effective lines are set in only one direction of the matrix, and in the procedure of controlling the dividend, the dividend is produced when a successful hand is formed on any of the effective lines in a card game using the trump cards, and the dividend is produced or a previously-produced dividend is changed when a maximum number of the effective lines in the matrix are selected and a predetermined combination is formed by the cards on the maximum number of the effective lines at least in a diagonal direction or in a direction perpendicular to the effective lines.

16. The game controlling method according to claim 15, wherein the matrix is formed as a two-dimensional matrix having a vertical direction and a horizontal direction and the effective lines are set only in the horizontal direction.

17. A storage medium readable by a computer, with a program stored therein, in which the program works the computer provided in a game system as a card deciding device for deciding a plurality of cards displayed on a game screen in a matrix, a betting device for setting a number of lines of a plurality of lines formed by the cards arranged in a predetermined direction on the game screen, each of the set lines being an effective line, the number of effective lines being set depending on the value of a play which a player sets by operating the input device, the betting device increasing the number of effective lines as the play value increases, and a dividend controlling device for controlling a dividend for the player according to a combination of the cards on any of the effective lines and a combination of the cards in a direction different from the direction of the effective lines, wherein the effective lines are set in only one direction of the matrix, and the dividend controlling device produces the dividend when a successful hand is formed on any of the effective lines in a card game using trump cards, and produces the dividend or a previously-produced dividend is changed when a maximum number of the effective lines in the matrix are selected and a predetermined combination is formed by the cards on the maximum number of the effective lines at least in a diagonal direction or in a direction perpendicular to the effective lines.

18. The storage medium according to claim 17, wherein the matrix is formed as a two-dimensional matrix having a vertical direction and a horizontal direction and the effective lines are set only in the horizontal direction.

* * * * *